(12) United States Patent
Goto et al.

(10) Patent No.: US 9,873,399 B2
(45) Date of Patent: Jan. 23, 2018

(54) FAR-SIDE AIRBAG APPARATUS AND METHOD FOR FOLDING AIRBAG

(71) Applicant: TOYODA GOSEI CO., LTD., Kiyosu-shi, Aichi-ken (JP)

(72) Inventors: Yoshiaki Goto, Kiyosu (JP); Yuji Matsuzaki, Kiyosu (JP); Yasushi Masuda, Kiyosu (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 0 days.

(21) Appl. No.: 15/347,075

(22) Filed: Nov. 9, 2016

(65) Prior Publication Data

US 2017/0151923 A1 Jun. 1, 2017

(30) Foreign Application Priority Data

Nov. 30, 2015 (JP) ................. 2015-233173

(51) Int. Cl.
| | |
|---|---|
| *B60R 21/16* | (2006.01) |
| *B60R 21/207* | (2006.01) |
| *B60R 21/2338* | (2011.01) |
| *B60R 21/235* | (2006.01) |
| *B60R 21/237* | (2006.01) |

(Continued)

(52) U.S. Cl.
CPC .......... *B60R 21/207* (2013.01); *B60R 21/235* (2013.01); *B60R 21/237* (2013.01); *B60R 21/2338* (2013.01); *B60R 21/274* (2013.01); *B60R 2021/23146* (2013.01); *B60R 2021/23161* (2013.01); *B60R 2021/23509* (2013.01)

(58) Field of Classification Search
CPC . B60R 21/207; B60R 21/2338; B60R 21/235; B60R 21/237; B60R 21/274

USPC ................. 280/730.2, 743.1, 743.2
See application file for complete search history.

(56) References Cited

U.S. PATENT DOCUMENTS 8,757,657 B1 * 6/2014 Hotta ................. B60R 21/233
280/730.2
9,120,457 B2 * 9/2015 Kino ................. B60R 21/207
(Continued)

FOREIGN PATENT DOCUMENTS

| JP | 2008-195355 A | 8/2008 |
| JP | 2014-237411 A | 12/2014 |

OTHER PUBLICATIONS

Extended European Search Report dated Mar. 30, 2017 issued in corresponding EP patent application No. 16198033.9.

*Primary Examiner* — Toan To
(74) *Attorney, Agent, or Firm* — Posz Law Group, PLC

(57) ABSTRACT

An airbag in an uninflated-and-spread form includes a rear-lower inflation portion and a front-upper inflation portion. The airbag is stored in a first vehicle seat. The vehicle seat adjacent to the first vehicle seat is a second vehicle seat. The front-upper inflation portion includes at least three bend portions, which are arranged in a flowing direction of inflation gas. A form between the uninflated-and-spread form and the storage form is a transitional form. In the transitional form, the bend portions are each bent relative to the adjacent bend portion and rolled toward the second vehicle seat relative to the rear-lower inflation portion such that the closer a bend portion is to the downstream end, the more inward the bend portion is located. In the transitional form, the upper end of the most upstream bend portion is connected to the upper end of the rear-lower inflation portion.

7 Claims, 11 Drawing Sheets

(51) Int. Cl.
B60R 21/274 (2011.01)
B60R 21/231 (2011.01)

(56) References Cited

U.S. PATENT DOCUMENTS

| | | | |
|---|---|---|---|
| 9,505,375 B2* | 11/2016 | Kobayashi | B60R 21/2346 |
| 2009/0001695 A1 | 1/2009 | Suzuki et al. | |
| 2011/0278826 A1* | 11/2011 | Fukawatase | B60R 21/231 |
| | | | 280/730.2 |
| 2012/0091697 A1* | 4/2012 | Wiik | B60R 21/23138 |
| | | | 280/730.2 |
| 2014/0151984 A1* | 6/2014 | Fukawatase | B60R 21/233 |
| | | | 280/730.2 |
| 2015/0021887 A1* | 1/2015 | Hiraiwa | B60R 21/233 |
| | | | 280/729 |
| 2015/0076803 A1* | 3/2015 | Fujiwara | B60R 21/207 |
| | | | 280/730.2 |
| 2015/0158453 A1* | 6/2015 | Fujiwara | B60R 21/207 |
| | | | 280/730.2 |
| 2015/0183393 A1 | 7/2015 | Kino et al. | |
| 2015/0314748 A1* | 11/2015 | Mihm | B60R 21/23138 |
| | | | 280/730.2 |
| 2016/0031407 A1* | 2/2016 | Yamanaka | B60R 21/233 |
| | | | 280/728.2 |

* cited by examiner

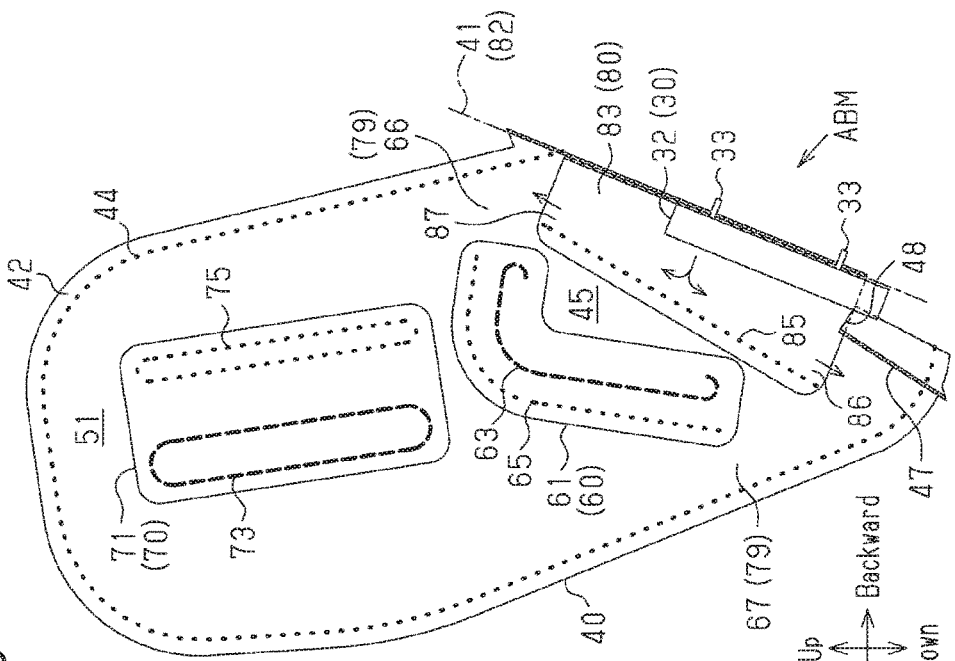
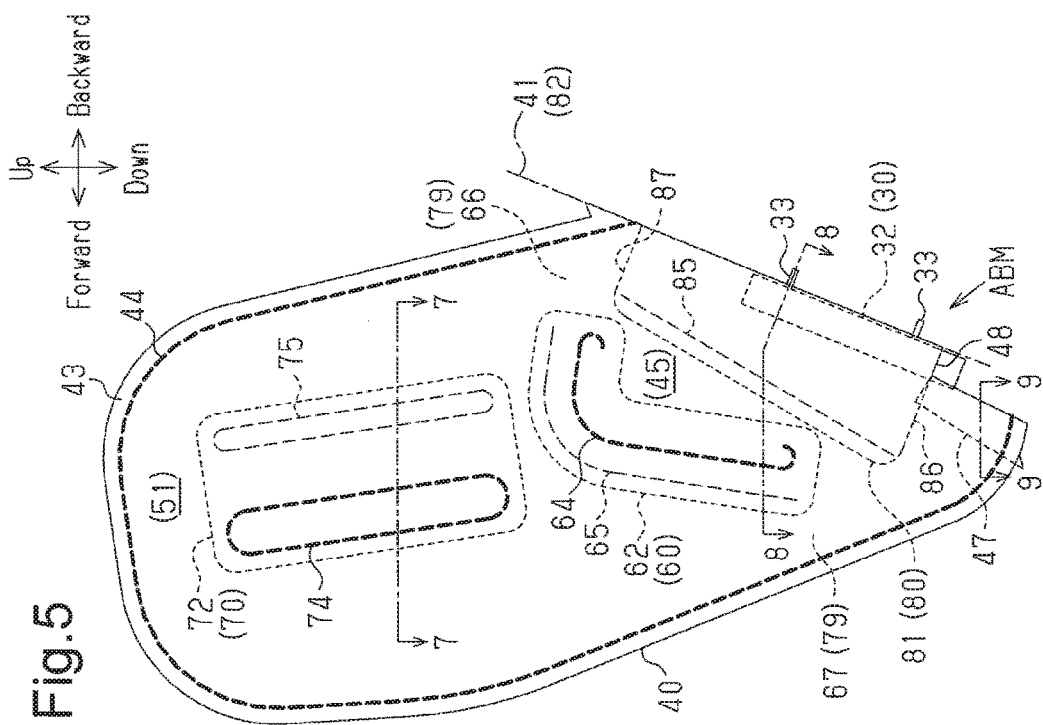

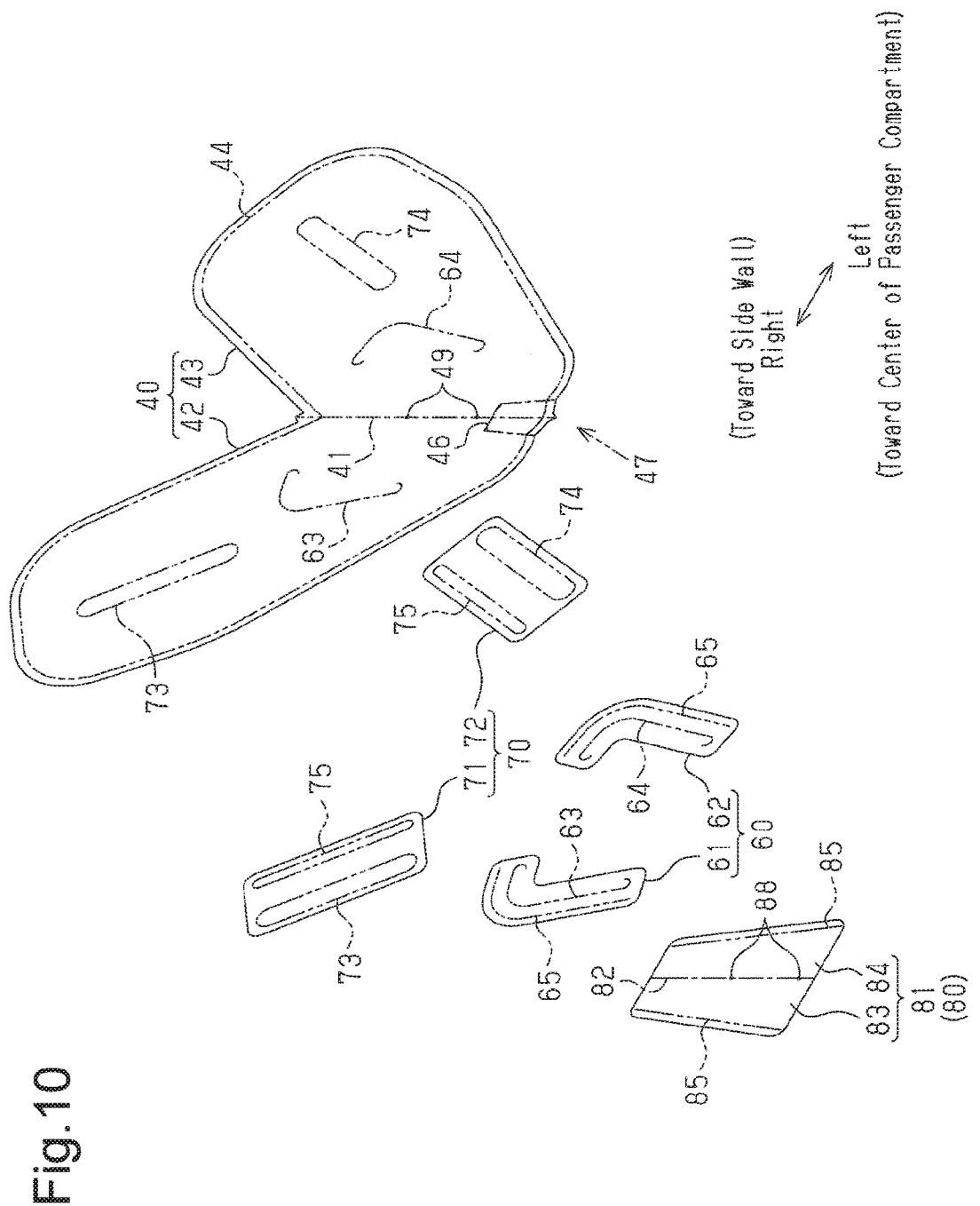

(Toward Center of Passenger Compartment)

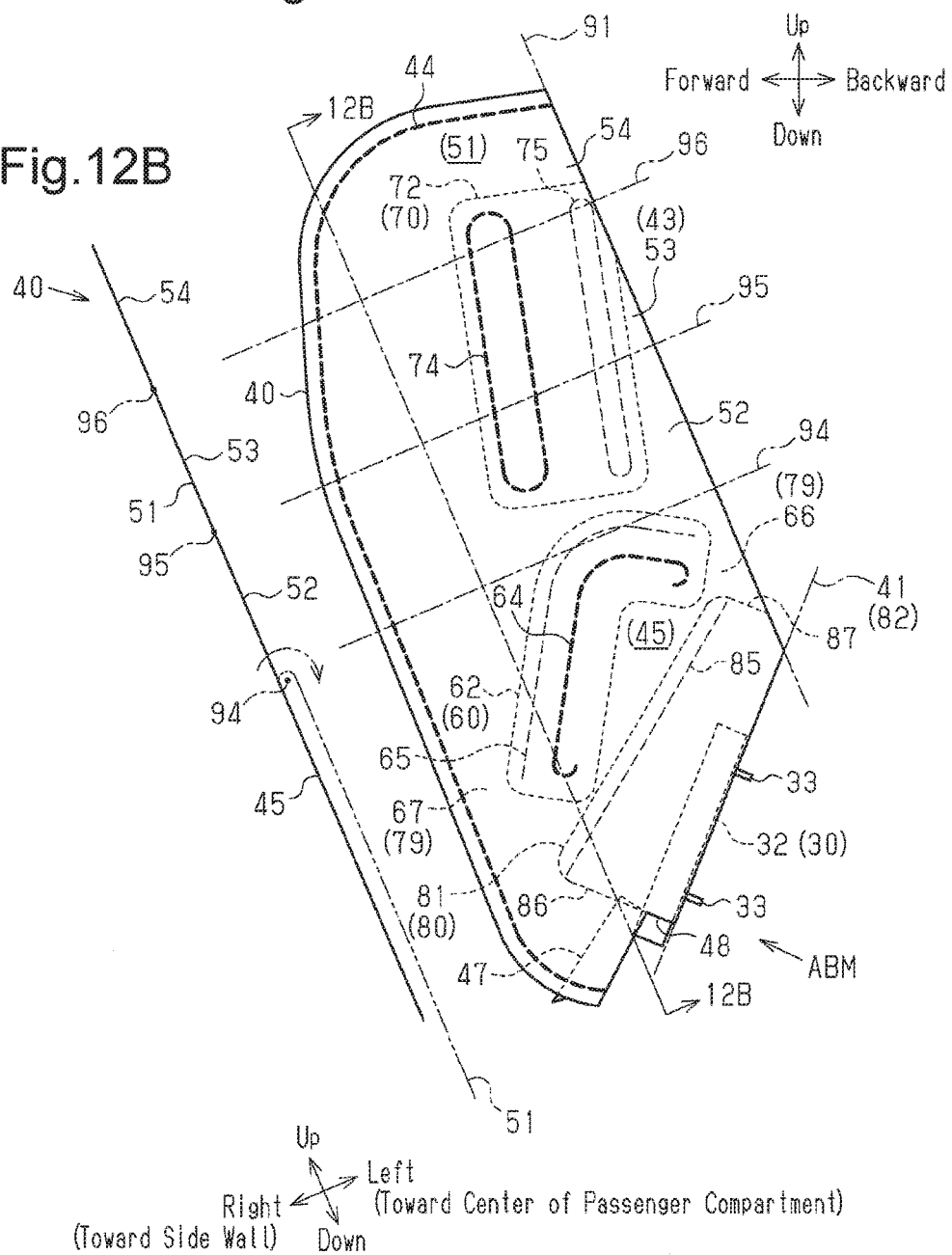

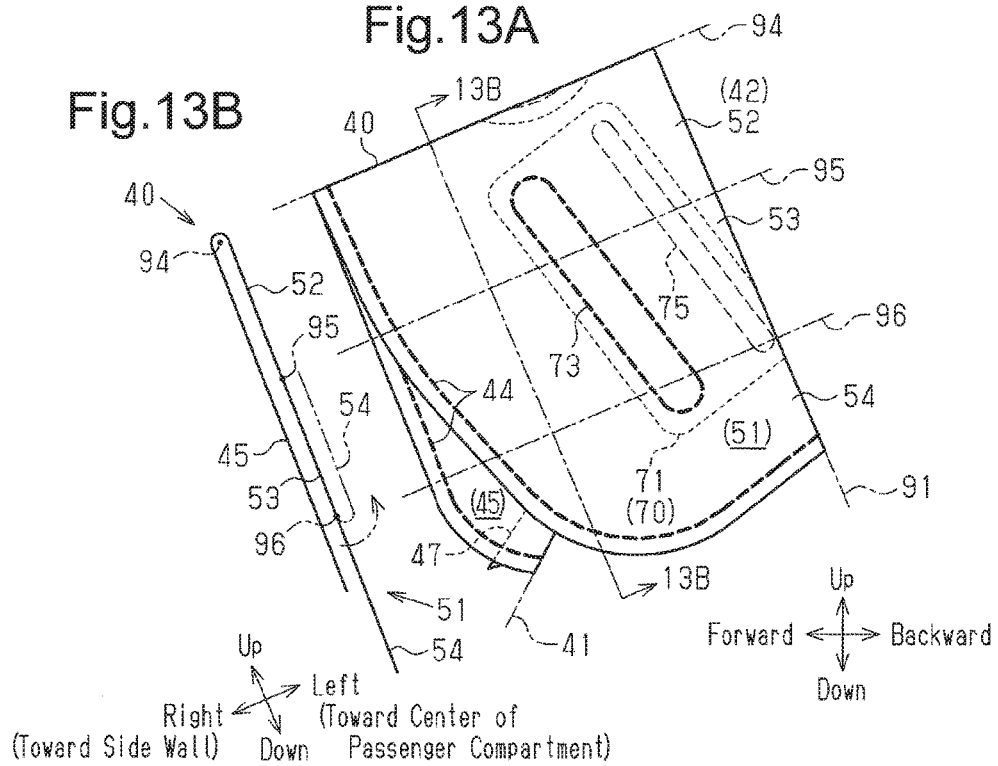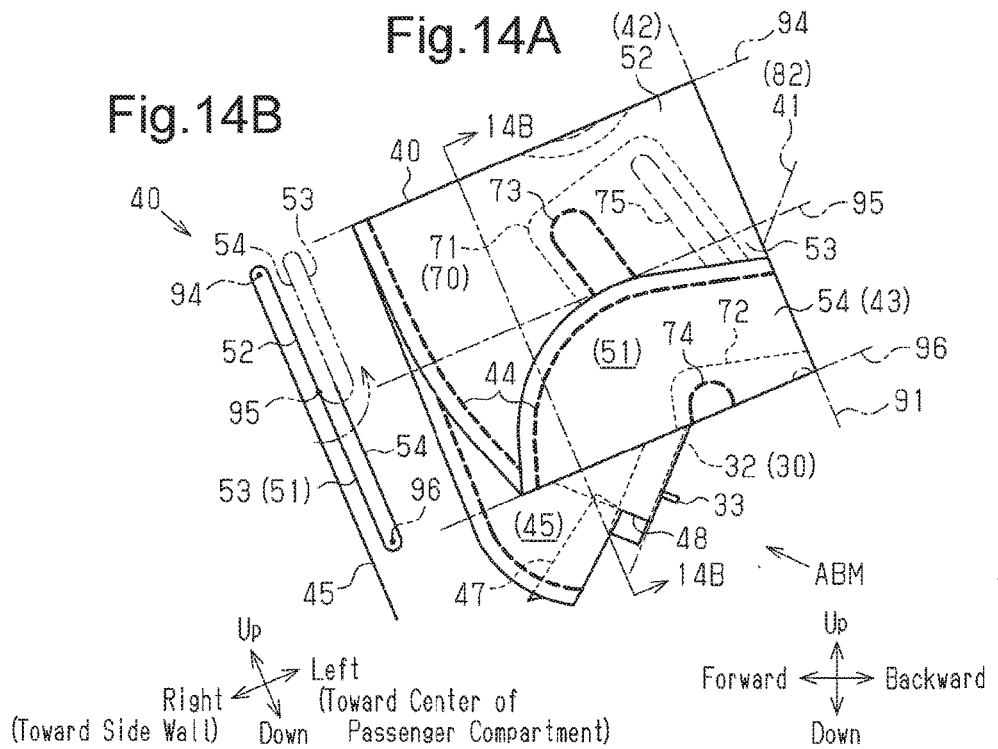

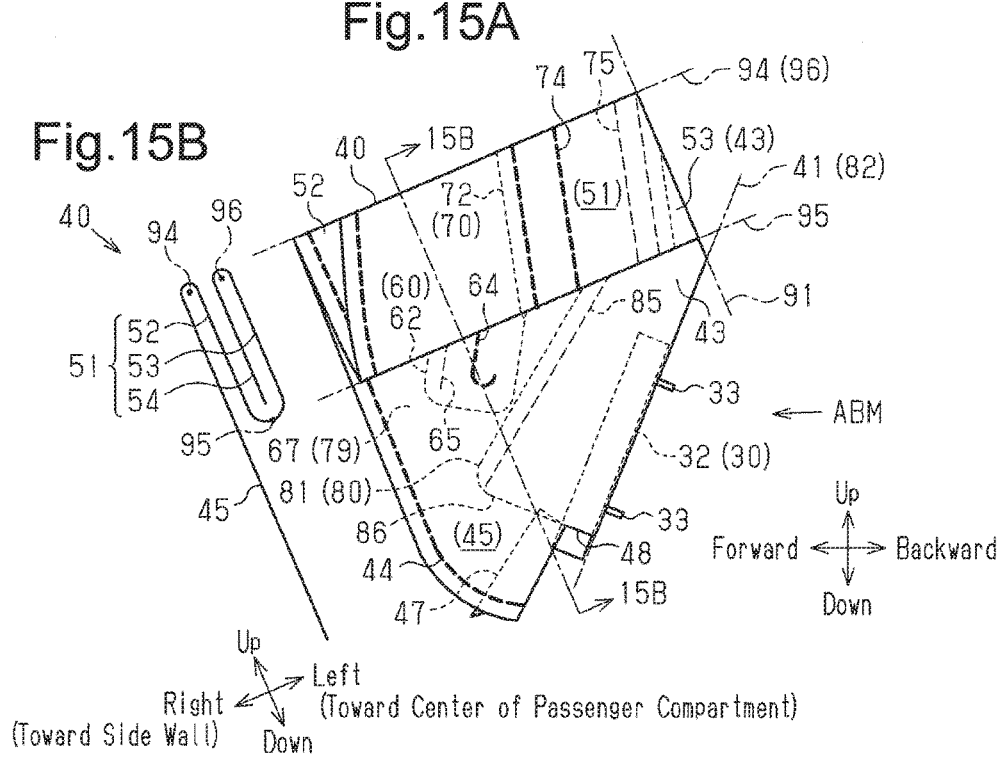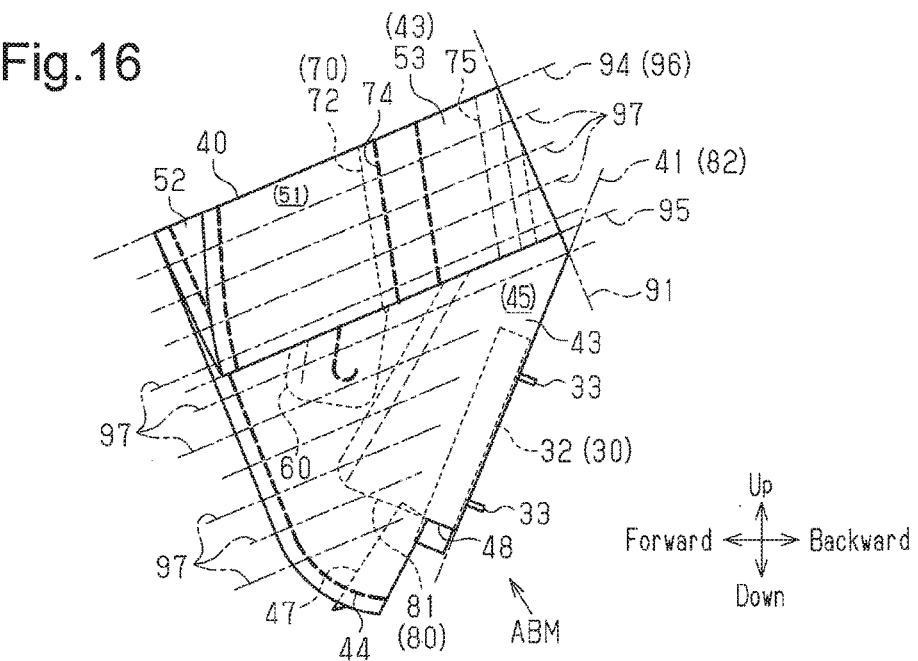

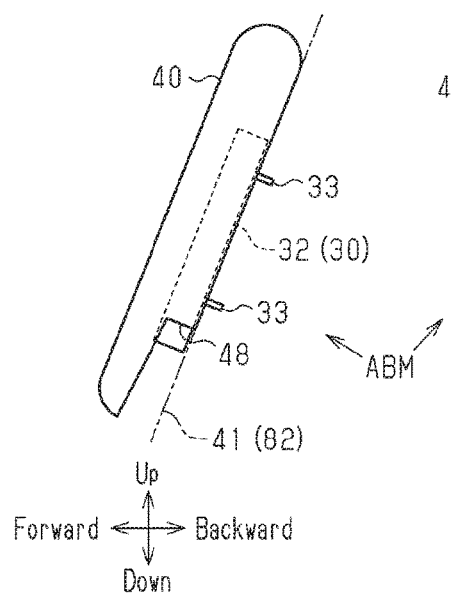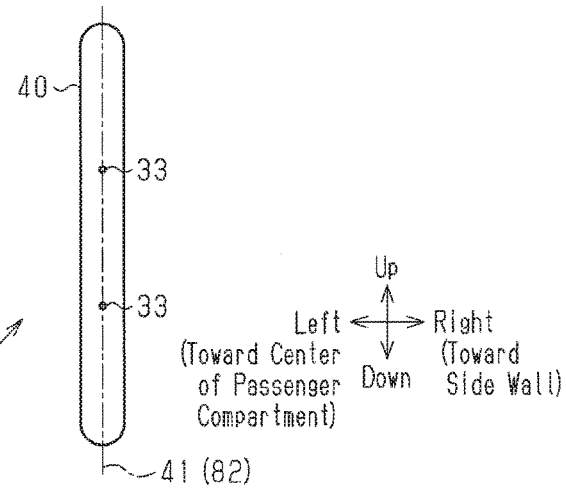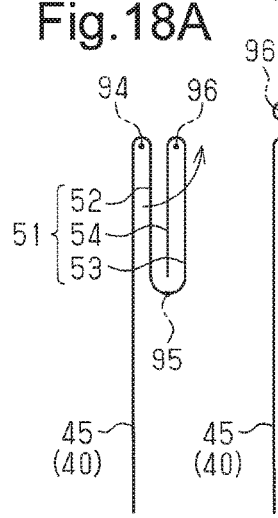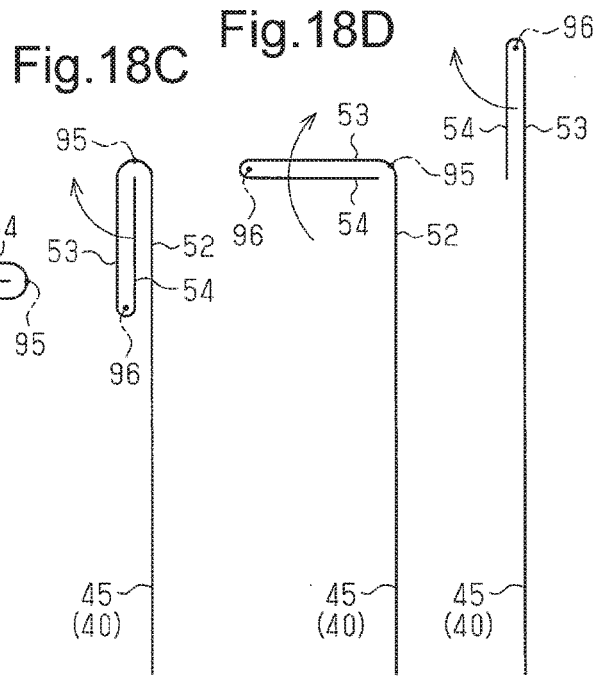

Fig.19
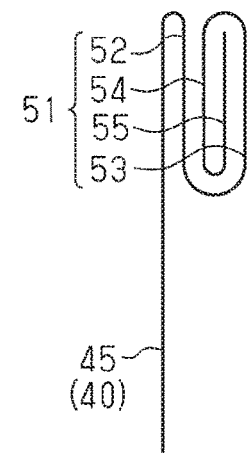
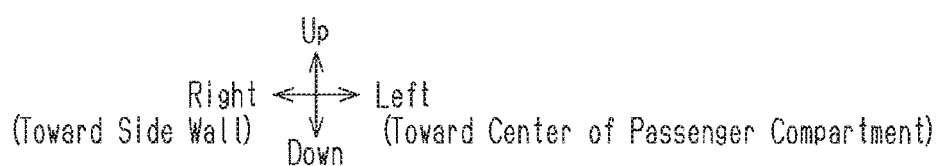

FAR-SIDE AIRBAG APPARATUS AND METHOD FOR FOLDING AIRBAG

BACKGROUND OF THE INVENTION

The present invention relates to a far-side airbag apparatus that, when an impact is applied to a side wall of a vehicle from the side, deploys and inflates an airbag forward and upward between two adjacent vehicle seats to protect an occupant seated in the seat farther from the side wall to which the impact has been applied. The present invention also relates to a method for folding the airbag of the far-side airbag apparatus.

Some vehicles that have two vehicle seats arranged in the vehicle width direction are equipped with far-side airbag apparatuses. A far-side airbag apparatus includes an airbag and a gas generator arranged in the airbag. The airbag and the gas generator are accommodated in one of the two vehicle seat, specifically, in a side portion that faces the adjacent vehicle seat. When spread to be flat without being filled with inflation gas, the airbag is in an uninflated-and-spread form of large dimensions, which is not suitable for storage. Thus, the airbag is folded typically by a method such as the roll-folding or the accordion-folding into a storage form, which is smaller in dimensions than the uninflated-and-spread form. The airbag in the storage form is then accommodated in the vehicle seat (for example, Japanese Laid-Open Patent Publication No. 2008-195355).

In a vehicle equipped with a far-side airbag apparatus, when an impact is applied from the side to a side wall such as a side door, the gas generator discharges inflation gas. The inflation gas deploys and inflates the airbag forward and upward between two adjacent vehicle seats to a position above the headrests of the vehicle seats. If an occupant is sitting in the vehicle seat on the far side from the side wall to which the impact has been applied, the upper body of that occupant acts to lean toward the side wall due to inertia. Then, the airbag receives the upper body to protect it from the impact.

It is supposed that, of the two vehicle seats, the one that incorporates the airbag and the gas generator is referred to as a first vehicle seat, and the other is referred to as a second vehicle seat. As the deployment of the airbag of the conventional far-side airbag apparatus by the inflation gas progresses, the airbag is deployed and inflated forward and upward either toward the occupant seated in the first vehicle seat or toward the occupant seated in the second vehicle seat. Thus, during the deployment, the airbag may catch on the arm or the shoulder of one of the two occupants seated in the first and second vehicle seats, which may hinder the subsequent deployment and inflation of the airbag.

SUMMARY OF THE INVENTION

Accordingly, it is an objective of the present invention to provide a far-side airbag apparatus and a method for folding the airbag that restrict the airbag from catching on an occupant seated in a vehicle seat, thereby restricting deployment and inflation of the airbag from being hindered.

To achieve the foregoing objective and in accordance with one aspect of the present invention, a far-side airbag apparatus that includes an airbag and a gas generator is provided. The airbag is stored, in a storage form, in a vehicle seat. The vehicle seat is one of two vehicle seats arranged in a width direction of a vehicle, and the airbag is stored in a side portion that faces the adjacent seat. The gas generator supplies inflation gas to the airbag in response to an impact applied to a side wall of the vehicle from a side. Each vehicle seat includes a headrest. One of the two vehicle seats in which the airbag is stored is a first vehicle seat. The other vehicle seat, which is adjacent to the first vehicle seat, is a second vehicle seat. The far-side airbag apparatus is configured such that the airbag is deployed and inflated forward and upward between the first and second vehicle seats to a position above the headrest of the first vehicle seat. The airbag has, in a lower part, a gas diverting passage that allows a greater amount of inflation gas from the gas generator to flow forward than upward. When spread to be flat without being filled with inflation gas, the airbag is in an uninflated-and-spread form of larger dimensions than those in the storage form. The airbag in the uninflated-and-spread form includes a rear-lower inflation portion, which includes the gas diverting passage and the gas generator, and a front-upper inflation portion adjacent to the rear-lower inflation portion. The front-upper inflation portion is in front of and above the rear-lower inflation portion. The front-upper inflation portion includes at least three bend portions, which are arranged in a flowing direction of inflation gas. When the airbag is in a transitional form, which is between the uninflated-and-spread form and the storage form. The bend portions are each bent relative to the adjacent bend portion and rolled toward the second vehicle seat relative to the rear-lower inflation portion such that the closer a bend portion is to a downstream end, the more inward the bend portion is located. Of the bend portions, the one that is located at a most upstream position in the flowing direction of inflation gas is a most upstream bend portion. In the transitional form, an upper end of the most upstream bend portion is connected to an upper end of the rear-lower inflation portion.

To achieve the foregoing objective and in accordance with a second aspect of another invention, a method for folding an airbag is provided, which is implemented to fold the airbag in the uninflated-and-spread form into the storage form during manufacture of the above described far-side airbag apparatus. The method includes folding the airbag in the uninflated-and-spread form into the transitional form. The folding includes folding back the front-upper inflation portion along a boundary with the rear-dower inflation portion toward the second vehicle seat with respect to the rear-lower inflation portion, and before or after the folding back, roll-folding the front-upper inflation portion to arrange the bend portions, which constitute the front-upper inflation portion, such that the closer a bend portion is to the downstream end in the flowing direction of inflation gas, the more inward the bend portion is located.

BRIEF DESCRIPTION OF THE DRAWINGS

FIG. 5 is a side view of the airbag module, in which the airbag is in an uninflated-and-spread form according to the embodiment.

FIG. 6 is a cross-sectional side view showing the internal structure of the airbag module shown in FIG. 5.

FIG. 10 is an exploded perspective view showing a spread state of some components of the airbag module according to the embodiment.

FIG. 12A is a side view illustrating the airbag module after being subjected to inward-folding.

FIG. 12B is a cross-sectional view taken along line 12B-12B of FIG. 12A.

FIG. 13A is a side view illustrating the airbag module after being subjected to folding back.

FIG. 13B is a cross-sectional view taken along line 13B-13B of FIG. 13A.

FIG. 14A is a side view illustrating the airbag module after being subjected to part of roil-folding.

FIG. 14B is a cross-sectional view taken along line 14B-14B of FIG. 14A.

FIG. 15A is a side view showing the airbag module in a transitional form.

FIG. 15B is a cross-sectional view taken along line 15B-15B of FIG. 15A.

FIG. 16 is a side view of the airbag module with folding lines, before being subjected to accordion-folding.

FIG. 17A is a side view of the airbag module, in which the airbag is in the storage form.

FIG. 17B is a rear view of the airbag module of FIG. 17A.

FIGS. 18A to 18E are explanatory diagrams conceptually showing the process in which the airbag in the transitional form is unfolded.

FIG. 19 is a diagram corresponding to FIG. 15B, illustrating a modification of an airbag in a transitional form.

DETAILED DESCRIPTION OF THE PREFERRED EMBODIMENTS

A far-side airbag apparatus and a method for folding an airbag according to one embodiment will now be described with reference to FIGS. 1 to 18E.

In the following description, the direction in which a vehicle advances forward will be referred to as the front, and the reverse direction will be referred to as the rear. The vertical direction refers to the up-down direction of the vehicle, and the left-right direction refers to the width direction of the vehicle (vehicle width direction) that agrees with the left-right direction when the vehicle is advancing forward. To identify sides in the vehicle width direction, the side closer to the side wall with reference to an occupant will be referred to as a side facing the side wall, and the side closer to the center of the passenger compartment will be referred to as a compartment center side. It is now assumed that an occupant having a size equivalent to a crash test dummy is seated in the vehicle seat.

Figure 1:
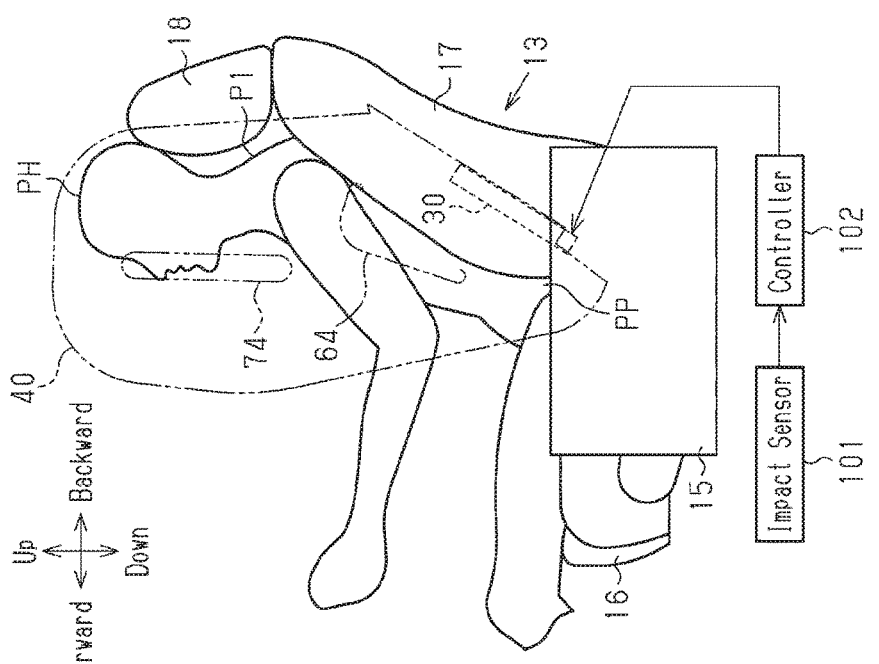
FIG. 1 is a partial plan view of a vehicle to which a far-side airbag apparatus and a method for folding an airbag according to one embodiment are applied.

As shown in FIG. 1, the sides in the vehicle width direction of a vehicle 10 are formed by side walls 11, 12, which include doors and pillars. The vehicle 10 has two vehicle seats 13, 14 in the passenger compartment, which are arranged in the vehicle width direction. The vehicle seat 13 on the side closer to the side wall 11 serves as a driver's seat, in which an occupant P1 is seated. The occupant P1 thus corresponds to the driver. The vehicle seat 14 on the side closer to the side wall 12 serves as a front passenger seat, in which an occupant P2 is seated. In the passenger compartment, a center console box 15 is arranged between the vehicle seats 13, 14. The vehicle seats 13, 14 have similar structures. In this description, only the vehicle seat 13, which corresponds to the driver's seat, will be described, and the explanations for the vehicle seat 14, which corresponds to the front passenger seat, will be omitted.

Figure 2:
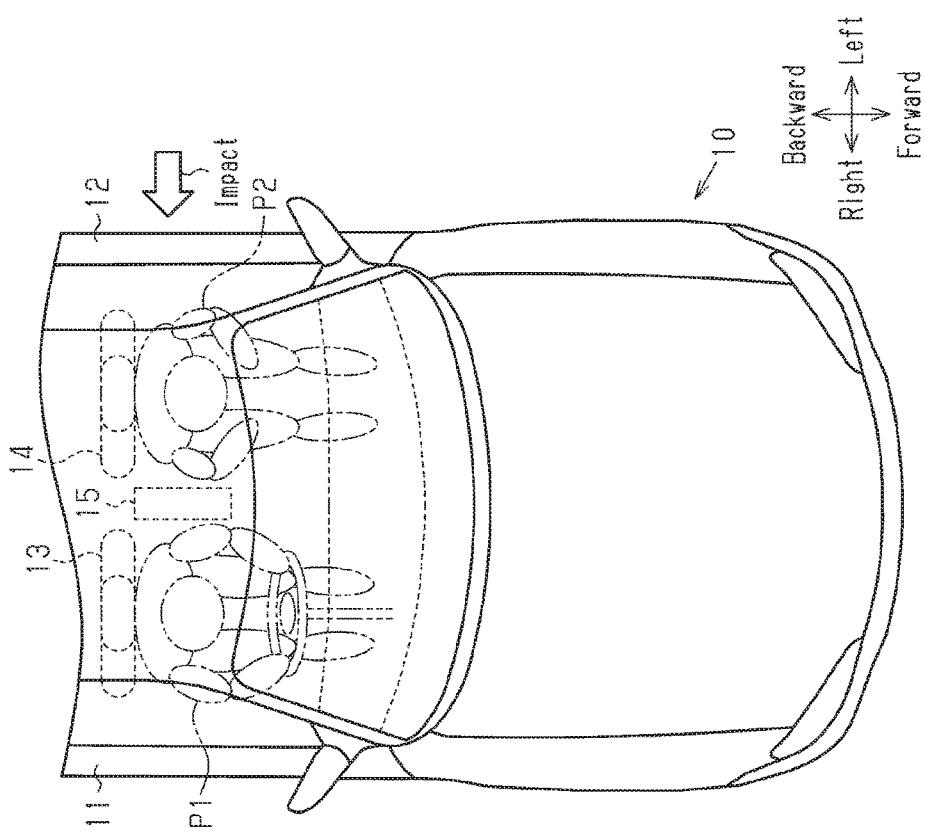
FIG. 2 is a side view illustrating, together with an occupant, a center console box, and an airbag, a vehicle seat in which the far-side airbag apparatus of the embodiment is installed.
Figure 4:
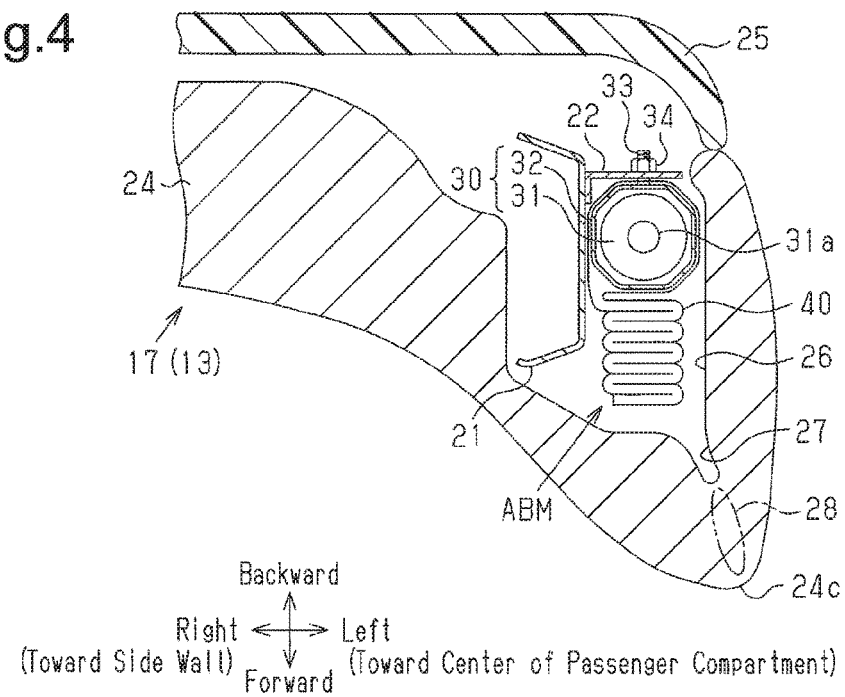
FIG. 4 is a cross-sectional plan view partially showing the internal structure of a side portion of the seat back in which an airbag module is installed in the embodiment.
Figure 7:
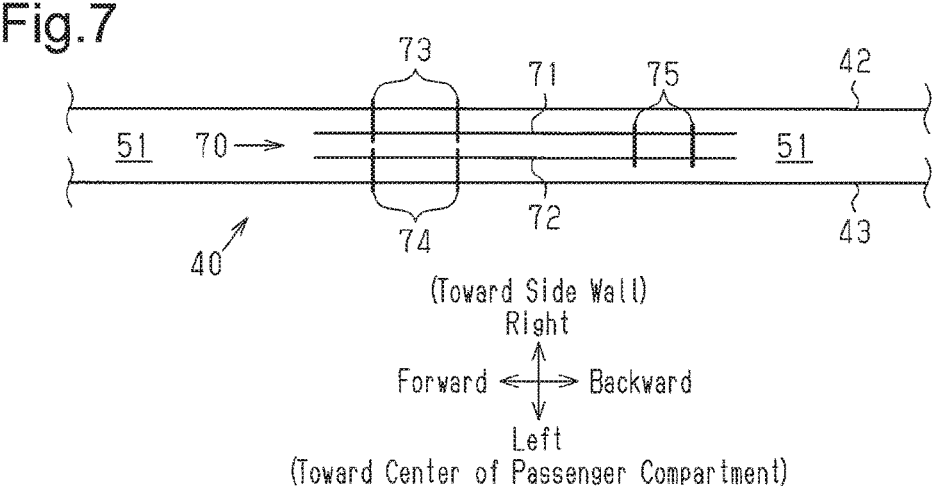
FIG. 7 is a cross-sectional view taken along line 7-7 of FIG. 5.

As shown in FIGS. 2 and 4, the vehicle seat 13 includes a seat cushion 16, a seat back 17, which extends upward from the rear end of the seat cushion 16, and a headrest 18 arranged on the top of the seat back 17. The tilt angle of the seat back 17 is adjustable.

The vehicle seat 13 includes an airbag module ABM in a first side portion, which is on the compartment center side, which is the side facing the adjacent vehicle seat 14. The airbag module ABM constitutes a main part of the far-side airbag apparatus. The vehicle seat 14, which corresponds to the passenger seat, does not have the airbag module ABM. That is, of the two vehicle seats 13, 14, the vehicle seat 13 corresponds to a first vehicle seat, in which the airbag module ABM is provided, and the vehicle seat 14 adjacent to the vehicle seat 13 corresponds to a second vehicle seat.

The internal structure of the first side portion of the vehicle seat 13 will now be described.

The seat back 17 incorporates a seat frame, which forms the framework. The seat frame includes a side frame portion 21, which is provided in the first side portion of the seat back 17 as shown in FIG. 4.

The side frame portion 21 is formed by bending a metal plate such that it extends in the front-rear direction and the vertical direction. A bracket 22 is fixed to the rear part of the side frame portion 21. The bracket 22 has bolt holes (not shown) at two positions spaced apart in the vertical direction. The bolt holes extend in the front-rear direction through the bracket 22.

A seat pad 24, which is made of an elastic material such as urethane foam, is provided in front of the seat frame, which includes the side frame portion 21. Also, a hard back board 25, which is formed, for example, of plastic, is arranged on the back of the seat frame. Although the seat pad 24 is coated with a cover, the cover is not illustrated in FIG. 4.

In the seat pad 24, a storage portion 26 is provided in a section closer to the center of the passenger compartment than the side frame portion 21 is to the center of the passenger compartment. The storage portion 26 incorporates the airbag module ABM.

A slit 27 extends diagonally forward from a front corner of the storage portion 26. A section between a front corner 24c of the seat pad 24 and the slit 27, that is, a section surrounded by a long dashed double-short dashed line in FIG. 4, forms a breakable portion 28, which is designed to be broken by an airbag 40.

The airbag module ABM includes as its main components a gas generator 30 and the airbag 40. Each of these components will now be described.

<Gas Generator 30>

The gas generator 30 includes an inflator 31 and a retainer 32, which surrounds the inflator 31. In the present embodiment, a pyrotechnic type inflator is employed as the inflator 31. The inflator 31 is substantially columnar and accommodates a gas generating agent. (not shown), which generates inflation gas. The inflator 31 has a gas outlet 31a at the upper end. A harness (not shown) for delivering activation signals to the inflator 31 is connected to the lower end of the inflator 31.

In place of the pyrotechnic type inflator using the gas generating agent, it is possible to use a hybrid type inflator, which discharges inflation gas by breaking a partition wall of a high-pressure gas cylinder filled with high-pressure gas with a low explosive.

The retainer 32 functions as a diffuser for controlling the direction of discharged inflation gas and also functions to fasten the inflator 31, together with the airbag 40, to the bracket 22. Most of the retainer 32 is formed by bending a plate such as a metal plate into a cylindrical shape. Rearward extending bolts 33 are fixed to the retainer 32 at two positions spaced apart from each other in the vertical direction. The two bolts 33 are members for attaching the retainer 32 to the bracket 22. The gas generator 30 may be formed by integrating the inflator 31 and the retainer 32.

<Airbag 40>

FIG. 5 shows the airbag module ABM in a state in which the airbag 40 is spread in a planar form without being filled with inflation gas. That is, FIG. 5 shows the airbag module ABM in an uninflated-and-spread form. FIG. 10 shows some components of the airbag module ABM including the airbag 40 in a spread state. FIG. 6 shows the airbag module ABM, in which the airbag 40 of FIG. 5 is cut at the center with respect to the vehicle width direction to show the internal structure of the airbag module ABM.

As shown in FIGS. 5, 6, and 10, the airbag 40 is formed by folding, in half, a single fabric piece, which is also referred to as a base fabric, or a fabric panel, forward along a folding line 41, which is defined at the center, to be stacked in the vehicle width direction, and joining the overlapped parts to form a bag-like structure. To distinguish the two stacked parts of the airbag 40, the part located on the side facing the side wall 11 will be referred to as a fabric portion 42, and the part located on the compartment center side will be referred to as a fabric portion 43.

In the present embodiment, the fabric piece is folded in half such that the folding line 41 is located at the rear end of the airbag 40. However, the fabric piece may be folded in half such that the folding line 41 is located at another end such as the front end, the upper end, or the lower end. The airbag 40 may also be formed of two fabric pieces divided along the folding line 41. In this case, the airbag 40 is formed by stacking two fabric pieces in the vehicle width direction and joining the entire peripheries of the fabric pieces to each other. At least one of the fabric portions 42, 43 may be formed by two or more fabric pieces.

The outer shapes of the fabric portions 42, 43 of the airbag 40 are symmetric with respect to an axis of symmetry, which is the folding line 41. As shown in FIG. 2, the position and the vertical dimension of the airbag 40 are determined such that, when the airbag 40 is deployed and inflated, the lower end of the airbag 40 is located below the upper end of the center console box 15, and the upper end of the airbag 40 is located above the headrest 18 of the vehicle seat 13, which corresponds to the first vehicle seat.

The fabric portions 42, 43 are preferably formed of a strong material that is flexible to facilitate folding and resists stretching. The material may be, for example, woven cloth formed of polyester threads or polyamide threads.

The fabric portions 42, 43 are joined at a peripheral joint portion 44 provided at the peripheries of the fabric portions 43, 44. The peripheral joint portion 44 is formed by sewing parts of the peripheries of the fabric portions 43, 44 except for the rear end, more specifically, the part in the vicinity of the folding line 41. Joint portions 63 to 65, 73 to 75, 85, which will be discussed below, have a similar structure.

In FIGS. 5, 6, 11A, 12A, 13A, 14A, 15A, and 16, sewn portions are indicated by first to third broken lines of different types. The first broken line includes thick line segments of a certain length arranged intermittently and represents sewing threads as viewed from the side (refer to the peripheral joint portion 44 and joint portions 64, 74 in FIG. 5). The second broken line includes thin line segments of a certain length (longer than that in a typical broken line) arranged intermittently and represents the state of sewing threads that are located, for example, behind a fabric piece and cannot be seen directly (refer to the joint portions 65, 75, 85 in FIG. 5). The third broken line includes dots arranged at predetermined intervals and represents the cross-section of the sewing threads extending along a plane that passes through the sewn portions (refer to the peripheral joint portion 44 and the joint portions 65, 75, 85 in FIG. 6).

The peripheral joint portion 44 may be formed by a method other than sewing using sewing threads. For example, the peripheral joint portion 44 may be formed by adhesion with adhesive. This also applies to the joint portions 63 to 65, 73 to 75, and 85.

The space between the fabric portions 42, 43 surrounded by the peripheral joint portion 44 and the folding line 41 serves as an inflation portion, which is deployed and inflated with inflating gas. The inflation portion includes a rear-lower inflation portion 45, which constitutes a rear-lower part of the inflation portion, and a front-upper inflation portion 51 adjacent to the rear-lower inflation portion 45. Specifically, the front-upper inflation portion 51 is in front of and above the rear-lower inflation portion 45. In the present embodiment, the airbag 40 in the uninflated-and-spread form is folded back along a folding line 94, which is set between the joint portion 73 (74) and the joint portion 63 (64) as shown in FIGS. 12A and 12B, when made into a storage form via a transitional form, which will be discussed below. In the airbag 40 in the uninflated-and-spread form, the region behind and below the folding line 94 constitutes the rear-lower inflation portion 45, and the region in front of and above the folding line 94 constitutes the front-upper inflation portion 51.

Figure 9:
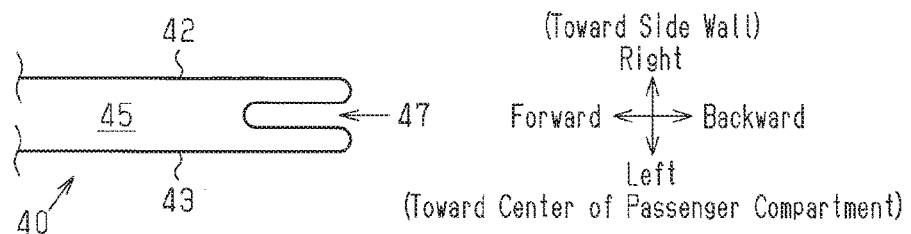
FIG. 9 is a cross-sectional view taken along line 9-9 of FIG. 5.

As shown in FIG. 10, the airbag 40 has a slit 46, which extends orthogonally to the folding line 41. As shown in FIGS. 5 and 9, a part of the fabric portions 42, 43 below the slit 46 constitutes an inward folding portion 47, which is folded inward of the remaining parts. The lower end of the inward folding portion 47 is joined to the remaining parts of the fabric portions 42, 43 by the peripheral joint portion 44. When the inward folding portion 47 is formed, the slit 46 is opened to form an insertion port 48 for the gas generator 30.

Figure 8:
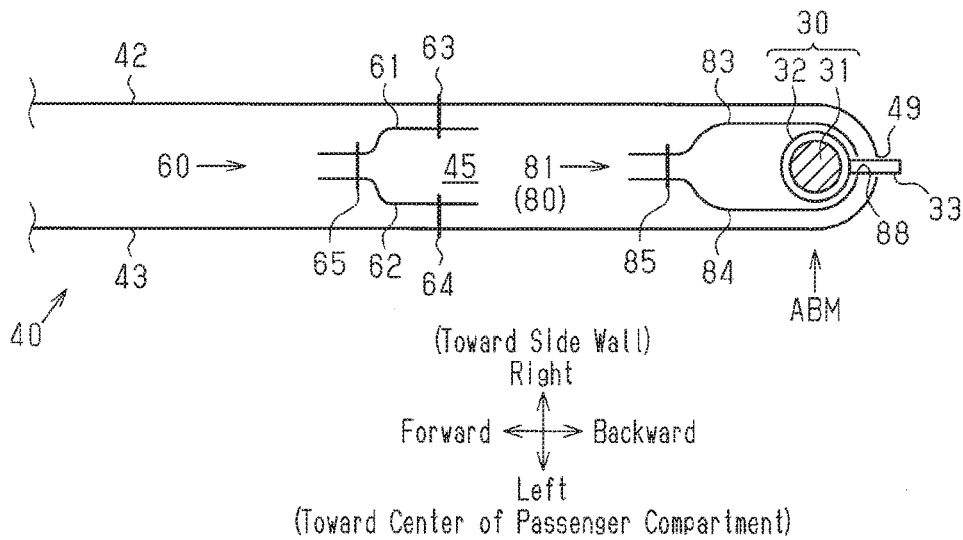
FIG. 8 is a cross-sectional view taken along line 8-8 of FIG. 5.

As shown in FIGS. 5, 8, and 10, bolt holes 49 for inserting the bolts 33 of the gas generator 30 are formed at two positions on the folding line 41 of the airbag 40 above the slit 46.

The airbag 40 has a lower partition 60 and an upper partition 70 at positions spaced apart from the peripheral joint portion 44 and from each other. The lower and upper partitions 60, 70 divide the airbag 40 into multiple regions. Each of the lower partition 60 and the upper partition 70 has a structure similar to a member generally referred to as a tether and functions as a thickness limiting portion for limiting the inflation thickness in the vehicle width direction of the airbag 40.

As shown in FIGS. 6, 8, and 10, the lower partition 60 is arranged in the rear-lower inflation portion 45 at a position in front of and above the gas generator 30. The lower partition 60 is constituted by two fabric portions 61, 62, which are made of a material similar to the material of the airbag 40. When the airbag 40 is in the uninflated-and-spread form, the fabric portions 61, 62 are stacked onto each other in the vehicle width direction. In this state, the fabric portions 61, 62 are curved such that the middle section in the vertical direction bulges forward and upward.

The fabric portion 61 on the side facing the side wall 11 is joined to the fabric portion 42 adjacent to the fabric portion 61 by the joint portion 63. Likewise, the fabric portion 62 on the compartment center side is joined to the fabric portion 43 adjacent to the fabric portion 62 by the joint portion 64. The fabric portions 61, 62 are joined to each other by a joint portion 65 located at a position spaced apart from the joint portions 63, 64. These joining structures allow the lower partition 60 to bridge the fabric portions 42 and 43 of the airbag 40 in the rear-lower inflation portion 45. When the fabric portions 61, 62 are in a tensioned state, the lower partition 60 restricts the inflated thickness in the vehicle width direction of the airbag 40 in the vicinity of the lower partition 60.

The rear-lower inflation portion 45 has an upper passage 66 at a position behind and above the lower partition 60. The upper passage 66 conducts upward some of the inflation gas from the gas generator 30. The rear-lower inflation portion 45 also has a front passage 67 at a position in front of and below the lower partition 60. The front passage 67 conducts forward some of the inflation gas from the gas generator 30.

As shown in FIGS. 6, 7, 10, and 12, the upper partition 70 is arranged in the front-upper inflation portion 51 at a position that is spaced apart downward from the upper end of the front-upper inflation portion 51 and spaced apart upward from the boundary with the rear-lower inflation portion 45 (the folding line 94). The upper partition 70 is constituted by two fabric portions 71, 72, which are made of a material similar to the material of the airbag 40. The fabric portions 71, 72 each have a substantially rectangular shape. When the airbag 40 is in the uninflated-and-spread form, the fabric portions 71, 72 are stacked onto each other in the vehicle width direction.

The fabric portion 71 on the side facing the side wall 11 is joined to the fabric portion 42 adjacent to the fabric portion 71 by the joint portion 73. Likewise, the fabric portion 72 on the compartment center side is joined to the fabric portion 43 adjacent to the fabric portion 72 by the joint portion 74. The fabric portions 71, 72 are joined to each other by a joint portion 75 located at a position spaced apart rearward from the joint portions 73, 74. These joining structures allow the upper partition 70 to bridge the fabric portions 42 and 43 of the airbag 40 in the front-upper inflation portion 51. When the fabric portions 71, 72 are in a tensioned state, the upper partition 70 restricts the inflated thickness in the vehicle width direction of the airbag 40 in the vicinity of the upper partition 70.

As shown in FIGS. 6, 8, and 10, an inner tube 80 is arranged in the rear-lower inflation portion 45 at a position behind the lower partition 60. The inner tube 80 extends vertically while surrounding at least the gas outlet 31a of the gas generator 30.

The inner tube 80 is formed by a single trapezoidal fabric piece the width of which increases toward the lower end. The fabric piece 81 is made of a material similar to the material of the airbag 40. The lower end of the fabric piece 81 is spaced apart upward from the lower end of the rear-lower inflation portion 45 (the peripheral joint portion 44). In the present embodiment, the vertical position of the fabric piece 81 is substantially the same as the height of the insertion port 48 in the airbag 40. The upper end of the fabric piece 81 is spaced apart downward from the upper end of the rear-lower inflation portion 45 (the peripheral joint portion 44).

The fabric piece 81 is folded forward in half along a folding line 82, which is defined at the center with respect to the vehicle width direction, to be stacked in the vehicle width direction. To distinguish the two stacked parts of the inner tube 80, the part located on the side facing the side wall 11 will be referred to as a fabric portion 83, and the part located on the compartment center side will be referred to as a fabric portion 84.

The front ends of the fabric portions 83, 84 are joined to each other by the joint portion 85, which extends along the front edges of the fabric portions 83, 84. As described above, the trapezoidal fabric piece 81 is used for the inner tube 80. Thus, the joint portal on 85, which is formed along the front edges of the fabric portions 83, 84, is inclined relative to the rear edge (the folding line 82) of the inner tube 80 such that, when the airbag 40 is in the uninflated-and-spread form, the distance to the rear edge (the folding line 82) of the inner tube 80 increases toward the lower end. Therefore, when supplied with inflation gas from the gas generator 30, the inner tube 80 is inflated into a tubular shape tapering from the lower end toward the upper end.

As described above, the lower ends of the fabric portions 83, 84 are not joined to each other. These parts, which are not joined, constitute a lower opening 86 of the inner tube 80. The upper ends of the fabric portions 83, 84 are not joined to each other. These parts, which are not joined, constitute an upper opening 87 of the inner tube 80. The lower opening 86 has a greater opening area than the upper opening 87.

The front passage 67, the upper passage 66, and the inner tube 80, which are located in the rear-lower inflation portion 45, constitute a gas diverting passage 79. The gas diverting passage 79 allows a greater amount of inflation gas from the gas generator 30 to flow forward than upward.

The inner tube 80 has bolt holes 88 at two positions on the folding line R2. The bolt holes 88 receive the bolts 33 of the gas generator 30 (refer to FIGS. 8 and 10).

The inner tube 80 is joined to the airbag 40 by a joining means such as sewing (not shown) with the bolt holes 88 aligned with the bolt holes 49 of the airbag 40.

The inner tube 80 may be folded in half such that the folding line 82 is located at the front end of the inner tube 80. In this case, the fabric portions 83, 84 of the inner tube 80 are joined to each other at the rear ends. The fabric portions 83, 84 of the inner tube 80 may be sewn together with the rear ends of the fabric portions 42, 43 of the airbag 40 by the peripheral joint portion 44. The inner tube 80 may also be formed of two fabric portions 83, 84 divided along a folding line 82.

As shown in FIG. 5, the gas generator 30 is inserted into the rear end of the airbag 40 while being oriented to extend substantially vertically. Specifically, most of the gas generator 30 except for the lower part is inserted into the inner tube 80 through the insertion port 48 substantially from below. Further, as shown in FIG. 8, the bolts 33 are inserted into the bolt holes 88, 49, so that the gas generator 30 is secured while being positioned with respect to the inner tube 80 and the airbag 40.

The airbag module ABM, which includes the gas generator 30 and the airbag 40 as main components, is made into a compact storage form as shown in. FIGS. 17A and 17B by folding the airbag 40 in the uninflated-and-spread form (see FIG. 5). The airbag module ABM is folded in this manner in order that it is suitable for being accommodated in the storage portion 26, which has a limited size in the side portion of the seat back 17.

The airbag 40 in the uninflated-and-spread form shown in FIG. 5 is subjected to a folding method shown in FIGS. 11A to 16 to be made into the storage form shown in FIGS. 17A and 17B. The folding method includes inward-folding, folding back, roll-folding, and accordion-folding. Of the four steps of folding, the folding back and the roll-folding are performed to fold the airbag 40 in the uninflated-and-spread form into a transitional form. The accordion-folding is performed to folding the airbag 40 in the transitional form into the storage form. Each folding will now be described.

<Inward-Folding>

Figure 11A:
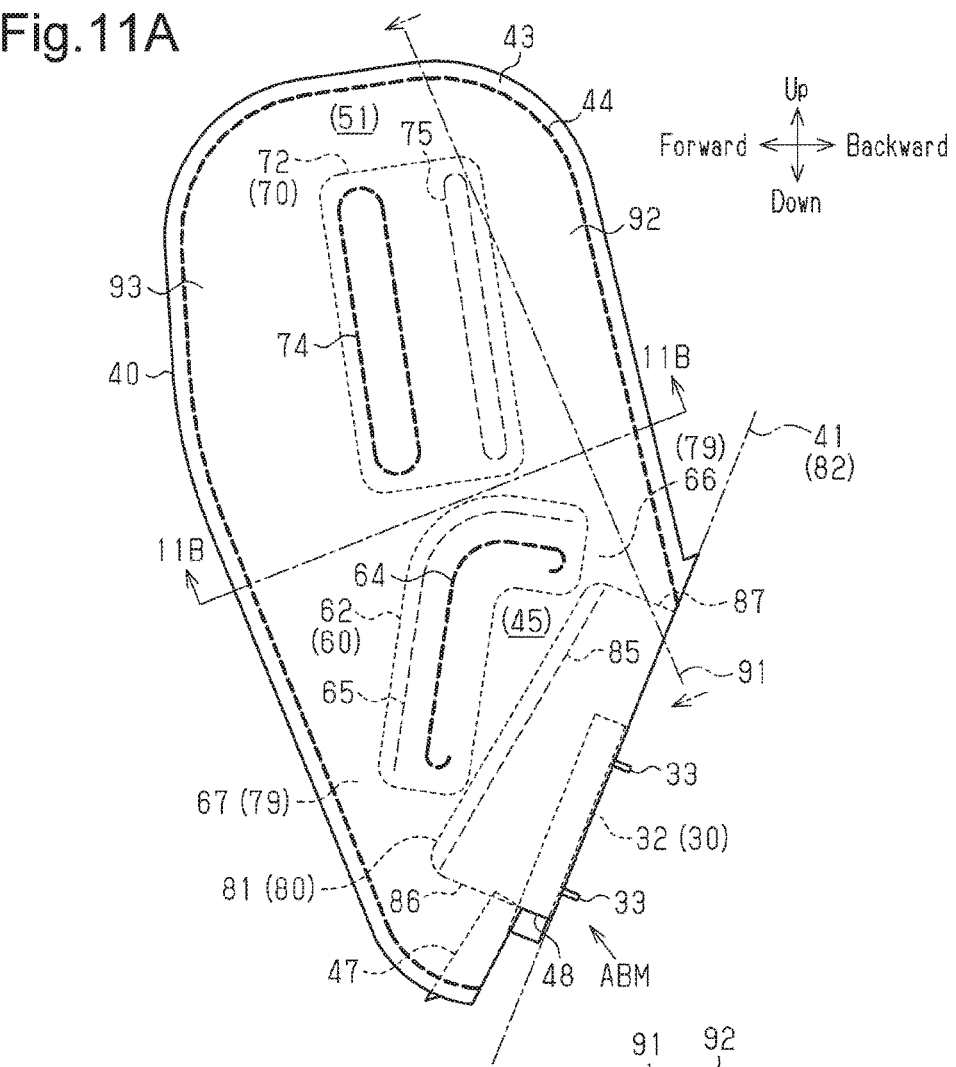
FIG. 11A is a side view of the airbag module with folding lines, illustrating a state before the airbag is folded according to the embodiment.
Figure 11B:
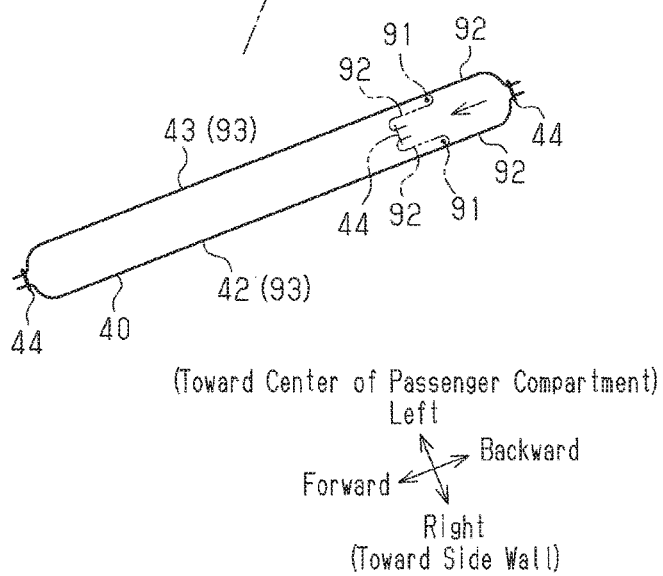
FIG. 11B is a cross-sectional view taken along line 11B-11B of FIG. 11A.

At the inward-folding, a folding line 91 is defined at the rear end portion of each of the fabric portions 42, 43 of the airbag 40 in the uninflated-and-spread form as shown in FIGS. 11A and 11B. The folding lines 91 are inclined to be higher toward the front ends and bridge the front-upper inflation portion 51 and the rear-lower inflation portion 45.

As indicated by arrows in FIGS. 11A and 11B, the fabric portions 42, 43 are folded inward along the folding lines 91 so that first sections 92 of the fabric portions 42, 43, which are behind the folding lines 91, are located inside second sections 93, which are in front of the folding lines 91. This folding is also referred to as inside reverse folding. The inward-folding causes the first sections 92 at the rear to be stacked on the second sections 93 at the front with respect to the vehicle width direction as indicated by long dashed double-short dashed lines in FIG. 11B. Accordingly, as shown in FIG. 12A, the dimension of the airbag 40 in the front-rear direction is slightly smaller than before the inward-folding.

<Folding Back>

Subsequently, as shown in FIGS. 12A and 12B, three folding lines 94, 95, 96 are defined on the airbag 40 after the inward-folding. The folding lines 94, 95, 96 are substantially orthogonal to the folding lines 91 and spaced apart from each other substantially in the vertical direction. The region on the the airbag 40 between the lowest folding line 94 and the folding line 41 constitutes the rear-lower inflation portion 45. The region on the airbag 40 above the folding line 94 constitutes the front-upper inflation portion 51.

The region on the front-upper inflation portion 51 between the lowest folding line 94 and the middle folding line 95 constitutes a bend portion 52. The region on the front-upper inflation portion 51 that is above the highest folding line 96 constitutes a bend portion 54. The region on the front-upper inflation portion 51 between the middle folding line 95 and the highest folding line 96 constitutes a bend portion 53. Of the three bend portions 52, 53, 54, the bend portion 52 is a most upstream bend portion 52, which is located at the most upstream position in the flowing direction of inflation gas, and the bend portion 54 is a most downstream bend portion 54, which is located at the most, downstream position in the flowing direction of the inflation gas. The bend portion 53 is an intermediate bend portion 53, which is located between the most upstream bend portion 52 and the most downstream bend portion 54.

As described above, the folding lines 94 to 96 are defined at three spaced apart positions, so that the bend portions 52, 53, 54 are arranged in the flowing direction of inflation gas (substantially vertical direction) on the front-upper inflation portion 51.

Then, along the folding line 94, which is the boundary between the front-upper inflation portion 51 and the rear-lower inflation portion 45, the front-upper inflation portion 51 is folded back toward the center of the passenger compartment with respect to the rear-lower inflation portion 45. That is, the front-upper inflation portion 51 is folded back toward the vehicle seat 14 (the second vehicle seat) with respect to the rear-lower inflation portion 45 along the folding line 94. Accordingly, as shown in FIGS. 13A and 13B, the most upstream bend portion 52 is put on the compartment center side of the rear-lower inflation portion 45. The upper end of the most upstream bend portion 52 is connected to the upper end of the rear-lower inflation portion 45.

Through the folding back, the vertical dimension of the airbag 40 becomes smaller than that immediately after the inward-folding.

<Roll-Folding>

The roll-folding is performed before or after the folding back. At the roll-folding, the front-upper inflation portion 51 is roll-folded to arrange the three bend portions 52 to 54 such that the closer a bend portion 52 to 54 is to the downstream end in the flowing direction of inflation gas, the more inward the bend portion. 52 to 54 is located.

More specifically, as shown in FIGS. 14A and 14B, the most downstream bend portion 54 is folded back toward the center of the passenger compartment along the folding line 96, which is the boundary with the intermediate bend portion 53. That is, the most downstream bend portion 54 is folded back toward the vehicle seat 14 (the second vehicle seat) along the folding line 96. Accordingly, the most downstream bend portion 54 is put on the compartment center side of the intermediate bend portion 53.

As shown in FIGS. 15A and 15B, the intermediate bend portion 53, on which the most downstream bend portion 54 is put, is folded back, together with the bend portion 54, toward the center of the passenger compartment along the folding line 95, which is the boundary with the most upstream bend portion 52. That is, the intermediate bend portion 53 is folded back, together with the bend portion 54, toward the vehicle seat 14 (the second vehicle seat) along the folding line 95. Accordingly, the bend portions 53, 54 are put on the compartment center side of the most upstream bend portion 52. In other words, the most downstream bend portion 54 is put on and placed between the most upstream bend portion 52 and the intermediate bend portion 53.

Through the folding back and the roll-folding, the three bend portions 52 to 54, which are arranged in the flowing direction of inflation gas in the front-upper inflation portion 51, are each bent relative to the adjacent bend portion. Specifically, the bend portions 52 to 54 are rolled toward the center of the passenger compartment relative to the rear-lower inflation portion 45 such that the closer a bend portion 52 to 54 is to the downstream end in the flowing direction of inflation gas, the more inward the bend portion 52 to 54 is located. That is, the bend portions 52 to 54 are rolled toward the vehicle seat 14 (the second vehicle seat) relative to the rear-lower inflation portion 45 such that the closer a bend portion 52 to 54 is to the downstream end in the flowing direction of inflation gas, the more inward the bend portion 52 to 54 is located.

The form of the airbag at this stage is referred to as a "transitional form" between the uninflated-and-spread form and the storage form. In the transitional form, the vertical dimension of the front-upper inflation portion 51 is smaller than that immediately after the folding back.

<Accordion-Folding>

As shown in FIG. 16, in the accordion-folding, folding lines 97, which are substantially parallel with the folding lines 94 to 96 and spaced apart from each other substantially in the vertical direction, are defined on the front-upper inflation portion 51, which has been subjected to the folding back and the roll-folding, and a region on the rear-lower inflation portion 45 that is in front of and above the gas generator 30. The interval between adjacent folding lines 97 is narrower than the interval between adjacent folding lines 94, 95 and the interval between adjacent folding lines 95, 96. The front-upper inflation portion 51 and the above-mentioned region on the rear-lower inflation portion 45 are repeatedly accordion-folded with a predetermined width along the folding lines 97 toward the gas generator 30, while alternating the folding direction. The airbag 40 is made into the storage form shown in FIGS. 17A and 17B, which is smaller in the dimensions in the vertical direction and the front-rear direction than the airbag 40 in the transitional form.

Thereafter, the airbag 40 is held in the storage form by a holding means, such as a binding tape (not shown).

As shown in FIG. 4, the airbag module ABM with the airbag 40 in the storage form is accommodated in the storage portion 26 of the seat back 17 of the vehicle seat 13. The bolts 33 (see FIG. 8), which extend from the gas generator 30 and are inserted in the bolt holes 88, 49 of the inner tube 80 and the airbag 40, are inserted into the bolt holes of the bracket 22 from the front. Nuts 34 are threaded to the bolts 33 from behind, so that the gas generator 30 is fixed to the bracket 22 together with the airbag 40 and the inner tube 80. That is, the gas generator 30 is fixed to the side frame portion 21 via the bracket 22.

The gas generator 30 may be attached to the bracket 22 using members other than the bolts 33 and the nuts 34. Alternatively, the inflator 31 may be directly attached to the bracket 22 without using the retainer 32.

As shown in FIG. 2, the far-side airbag apparatus includes an impact sensor 101, which includes an acceleration sensor, and a controller 102 in addition to the airbag module ABM. The impact sensor 101 is located, for example, in the side wall 12 to detect an impact applied to the side wall 12 or the like from the side. The controller 102 controls activation of the gas generator 30 (the inflator 31) based on a detection signal from the impact sensor 101.

The vehicle seat 13 is further equipped with a side airbag apparatus (not shown). When an impact is applied to the side wall 11 from the side, the side airbag apparatus deploys and inflates an airbag between the side wall 11 and the vehicle seat 13 to restrain the occupant P1 to protect the occupant from the impact. The side airbag apparatus of this type is also referred to as a near-side airbag apparatus. The vehicle seat 14 is also equipped with a near-side airbag apparatus similar to the one described above in the side portion facing the side wall 12.

Also, seat belt apparatuses (not shown) for restraining the occupants P1, P2 seated in the vehicle seats 13, 14 are installed in the passenger compartment.

Operation of the above described present embodiment will now be described.

When the impact sensor 101 does not detect any impact the magnitude of which is greater than or equal to a predetermined value from the side of the side wall 12, the controller 102 does not output to the gas generator 30 (the inflator 31) an activation signal for activating the gas generator 30. The gas generator 30 thus does not discharge inflation gas. As shown in FIG. 4, the airbag 40 remains stored in the storage portion 26 in the storage form.

As shown in FIG. 1, when an impact is applied to the side wall 12, for example, due to a side collision, the upper body of the occupant P1 on the driver's seat, which is on the far side from the side wall 12, to which the impact has been applied, acts to lean toward the side wall 12.

When the impact sensor 101 detects that an impact of a magnitude greater than or equal to the predetermined value has been applied to the side wall 12, the controller 102, based on a detection signal, outputs an activation signal for activating the gas generator 30 (the inflator 31) to the gas generator 30. In response to the activation signal, the inflator 31 discharges inflating gas through the gas outlet 31a. The inflation gas discharged from the inflator 31 is first supplied to the rear-lower inflation portion 45 of the airbag 40 in the storage form.

The inflation gas discharged from the inflator 31 flows along the wall of the inner tube 80 to be divided into a stream flowing upward and a stream flowing downward as indicated by arrows in FIG. 6. The upward stream of the inflation gas flows out rearward and upward from the opening 87 at the upper end of the inner tube 80. The downward stream of the inflation gas flows out forward and downward from the opening 86 at the lower end of the inner tube 80. Since the opening 86 is larger than the opening 87, the amount of inflation gas flowing out forward and downward is greater than the amount of inflation gas flowing out rearward and upward.

Some of the inflation gas discharged from the gas outlet 31a of the gas generator 30 flows forward and strikes the joint portion 85, which is the front edge of the inner tube 80, and is then divided into a stream flowing upward and a stream flowing downward. In the present embodiment, the joint portion 85, which is the front edge of the inner tube 80, is inclined relative to the rear edge, or the folding line 82, such that the distance to the rear edge increases toward the lower end.

Thus, when the inflation gas flowing forward strikes the joint portion 85, the inflation gas is divided into a stream flowing rearward and upward and a stream flowing forward and downward. When flowing rearward and upward, inflation gas receives a greater resistance than when flowing forward and downward. Thus, a greater amount of inflation gas is distributed as the rearward-upward stream than as the forward-downward stream. As a result, coupled with the fact that the opening 86 at the lower end of the inner tube 80 is larger than the opening 87 at the upper end, a greater amount of inflation gas flows out from the opening 86 than from the opening 87.

Thus, a greater amount of inflation gas is supplied to the front passage 67, which is connected to the lower opening 86, than to the upper passage 66, which is connected to the upper opening 87.

Some of the inflation gas in the rear-lower inflation portion 45 flows out upward through the upper passage 66. Also, some of the inflation gas in the rear-lower inflation portion 45 flows out forward through the front passage 67. Since the amount of inflation gas supplied to the front passage 67 is greater than the amount of inflation gas supplied to the upper passage 66, the amount of inflation gas that flows out forward through the front passage 67 is greater than the amount of inflation gas that flows out upward through the upper passage 66. In this manner, the inflation gas supplied to the rear-lower inflation portion 45 is divided into a forward stream of a greater amount and an upward stream of a smaller amount, and is then supplied to the front-upper inflation portion 51.

On the other hand, the supply of inflation gas increases the internal pressure of each of the sections in the airbag 40, which are divided by the lower partition 60 and the upper partition 70. This deploys and inflates the airbag 40 in the reverse order of the manner in which it was folded as illustrated in FIGS. 12A to 16.

At this time, as shown in FIG. 16, the rear-lower inflation portion 45 and the front-upper inflation portion 51, which have been accordion-folded, are unfolded so that the airbag 40 is deployed and inflated forward and upward.

Figure 3:
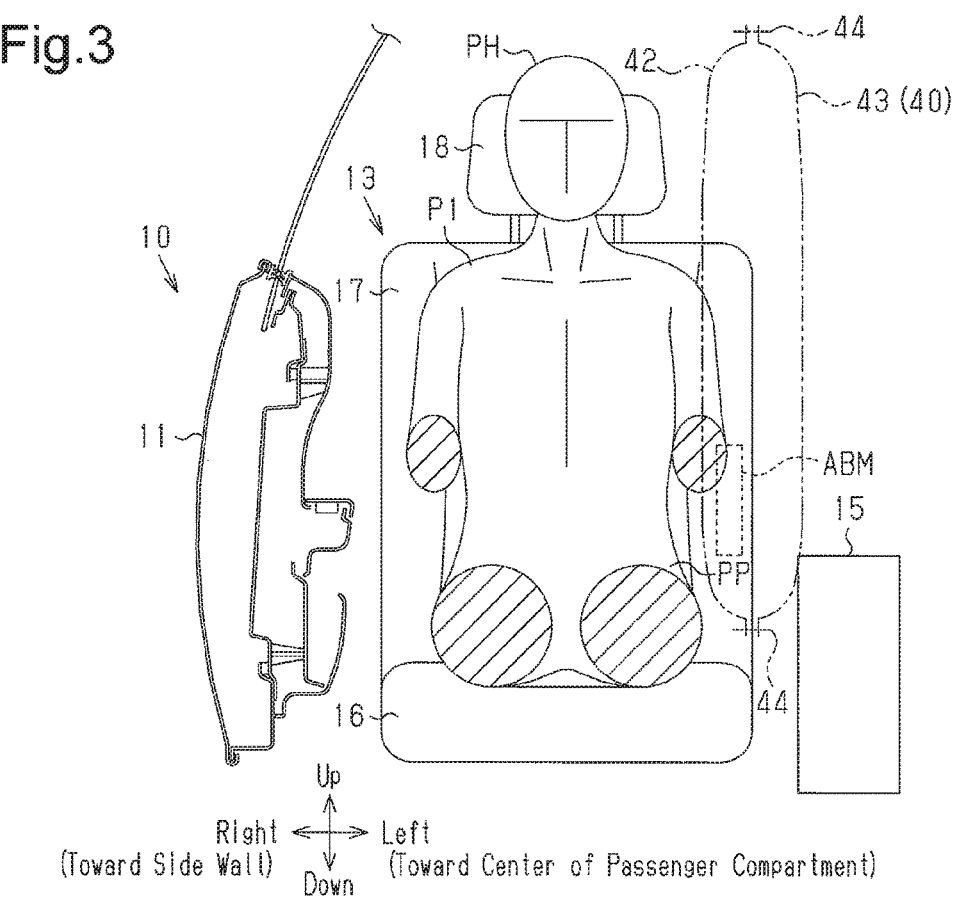
FIG. 3 is a cross-sectional view of the vehicle seat, the airbag, the occupant, the center console box, and the side wall of the embodiment, as viewed from the front of the vehicle.

In the middle of the deployment and inflation, the airbag 40 presses the seat pad 24 in the vicinity of the storage portion 26 shown in FIG. 4 and breaks the seat pad 24 at the breakable portion 28. With the part in the vicinity of the gas generator 30 remaining in the storage portion 26, the airbag 40 projects forward and upward from the storage portion 26. As shown in FIGS. 2 and 3, the airbag 40 is deployed and inflated to a position above the headrest 18 between the adjacent vehicle seats 13 and 14.

The lower part of the airbag 40 is located beside the lumbar region PP of the occupant P1, that is, beside the lower part of the seat back 17. The upper end of the airbag 40 is located above the head PH of the occupant P1. The lower end of the airbag 40 is located between the occupant P1 seated in the vehicle seat 13 and the center console box 15.

The upper body including the head PET of the occupant P1, who is seated in the vehicle seat 13 on the far side from the side wall 12, to which the impact has been applied, acts to lean toward the side wall 12 but is received by the airbag 40 and protected from the impact.

An airbag as a comparative example will now be discussed that has a partition bridging two fabric portions over the entire length in the vertical direction. In the comparative example, the partition divides the airbag a rear inflation portion located behind the partition and a front inflation portion located in front of the partition. The rear inflation portion is supplied with inflation gas from the gas generator. The front inflation portion is supplied with the inflation gas that has passed through the rear inflation portion. The partition has a communication portion that allows the rear inflation portion and the front inflation portion to communicate with each other. In the comparison example, the inflation gas from the gas generator is first supplied to the rear inflation portion and is then supplied to the front inflation portion through the communication portion. Thus, at an early stage of the deployment and inflation of the airbag, the internal pressure of the rear inflation portion becomes higher than the internal pressure of the front inflation portion. The body of an occupant that acts to lean toward the side wall to which an impact is applied is received by the rear inflation portion, the internal pressure of which is high.

In contrast, the airbag 40 of the present embodiment includes the upper partition 70, which is located in the front-upper inflation portion 51 at a position spaced apart downward from the upper end of the front-upper inflation portion 51 and is spaced apart upward from the boundary with the rear-lower inflation portion 45. In the airbag 40 having such a configuration, some of the inflation gas flows between the upper end of the front-upper inflation portion 51 and the upper partition 70. Also, some of the inflation gas flows between the upper partition 70 and the boundary between the front-upper inflation portion 51 and the rear-lower inflation portion 45. The boundary corresponds to the folding line 94. Thus, in the front-upper inflation portion 51, the part in front of the upper partition 70 and the part behind the upper partition 70 are deployed and inflated to similar extents, and the internal pressure is lower than the internal pressure of the rear inflation portion of the comparison example.

Also, since inflation gas flows through the gas diverting passage 79, a greater amount of inflation gas flows forward than upward. Such diversion of the inflation gas promotes the forward deployment of the airbag 40 more than the upward deployment. Particularly, the forward deployment of the front-upper inflation portion 51 is more promoted than the upward deployment.

Further, as described above, in the course of the deployment and inflation of the rear-lower inflation portion 45 and the front-upper inflation portion 51, the first sections 92 of the airbag 40, which are located inside, receive the rearward flow of the inflation gas and pushed out rearward in a straight manner.

FIGS. 18A to 18E conceptually illustrate motions of the bend portions 52 to 54 when the front-upper inflation portion 51 is deployed and inflated in the course of the deployment and inflation of the airbag 40.

As shown in FIG. 18A, inflation gas is supplied to the most upstream bend portion 52 in the front-upper inflation portion 51 after flowing through the rear-lower inflation portion 45. As shown in FIG. 18B, the most upstream bend portion 52, together with the other bend portions 53, 54, act to pivot toward the center of the passenger compartment about the upper end, which is the joint portion with the rear-lower inflation portion 45, that is, about the folding line 94. That is, the most upstream bend portion 52 is unfolded toward the space in front of and above the occupant P2 seated in the vehicle seat 14 (the second vehicle seat) in a manner avoiding the occupant P1 seated in the vehicle seat 13 (the first vehicle seat), in which the airbag 40 is accommodated.

When the most upstream bend portion 52 pivots to a position above the rear-lower inflation portion 45 as shown in FIG. 18C, the intermediate bend portion 53 acts to pivot toward the side wall 11 about the folding line 95, which is the joint portion with the most upstream bend portion 52 located on the upstream side of the intermediate bend portion 53 as shown in FIG. 18D. Also, as shown in FIG. 18E, the most downstream bend portion 54 acts to pivot toward the side wall 11 about the folding line 96, which is the joint portion with the intermediate bend portion 53 on the upstream side of the most downstream bend portion 54. That is, the bend portions 53, 54 other than the most upstream bend portion 52 are unfolded toward the space in front of and above the occupant P1 seated in the vehicle seat 13 (the first vehicle seat), in which the airbag 40 is accommodated, in a manner avoiding the occupant P2 seated in the vehicle seat 14 (the second vehicle seat).

In this manner, at the deployment of the front-upper inflation portion 51, the bend portions 53, 54 pivot in the direction opposite to the pivoting direction of the most upstream bend portion 52. Thus, during the deployment, the front-upper inflation portion 51 is restricted from excessively approaching the occupants P1, P2 seated in the adjacent vehicle seats 13, 14.

The present embodiment as described above achieves the following advantages.

(1) When the airbag 40 is made into the transitional form, which is between the uninflated-and-spread form and the storage form, all the bend portions 52 to 54 of the front-upper inflation portion 51 are each bent relative to the adjacent bend portion and rolled toward the center of the passenger compartment relative to the rear-lower inflation portion 45 such that the closer a bend portion 52 to 54 is to the downstream end in the flowing direction of inflation gas, the more inward the bend portion 52 to 54 is located. That is, the bend portions 52 to 54 are each bent relative to the adjacent bend portion and rolled toward the vehicle seat 14 (the second vehicle seat) relative to the rear-lower inflation portion 45 such that the closer a bend portion 52 to 54 is to the downstream end in the flowing direction of inflation gas, the more inward the bend portion 52 to 54 is located. Further, the upper end of the most upstream bend portion 52 is connected to the upper end of the rear-lower inflation portion 45 (FIGS. 14A, 14B, 15A, and 15B).

Thus, during the deployment, the front-upper inflation portion 51 is restricted from catching on the occupants P1, P2 seated in the adjacent vehicle seats 13, 14, so that deployment and inflation are not hindered.

(2) The airbag 40 includes the fabric portions 42, 43 and the upper partition 70, which bridges the fabric portions 42 and 43. In the front-upper inflation portion 51, the upper partition 70 is located at a position that is spaced apart downward from the upper end of the front-upper inflation portion 51 and spaced apart upward from the boundary with the rear-lower inflation portion 45 (the folding line 94) as shown in FIG. 12.

Thus, when an impact is applied to the side wall 12 and the body of the occupant P1 acts to lean toward the side wall 12, the body of the occupant P1 is received by the whole front-upper inflation portion 51, which is large and has a low internal pressure.

(3) The airbag 40 includes the fabric portions 42, 43 and the lower partition 60, which bridges the fabric portions 42 and 43. The lower partition 60 is located inside the rear-lower inflation portion 45. The gas diverting passage 79 includes the upper passage 66, which is located behind and above the lower partition 60, and the front passage 67, which is located in front of and below the lower partition 60 in the rear-lower inflation portion 45 (FIGS. 6 and 8). The front passage 67 conducts a greater amount of inflation gas forward than the upper passage 66.

Thus, the forward deployment of the front-upper inflation portion 51 is more promoted than the upward deployment. Thus, even if there is an obstacle above the airbag 40 stored in the vehicle seat 13, the airbag 40 is prevented from pushing the obstacle hard during the deployment and inflation.

(4) The airbag 40 includes the inner tube 80, which is located in the rear-lower inflation portion 45 at a position behind the lower partition 60. The inner tube 80 has the openings 87, 86 at the upper and lower ends. The lower opening 86 has a greater opening area than the upper opening 87. The gas diverting passage 79 is formed by the inner tube 80, the upper passage 66, and the front passage 67 (FIGS. 6 and 8).

Thus, a greater amount of inflation gas flows from the front passage 67 to the front-upper inflation portion 51 than from the upper passage 66 to the front-upper inflation portion 51, so that forward deployment and inflation of the airbag 40 are more promoted than upward deployment and inflation.

(5) The folding the airbag 40 in the uninflated-and-spread form into the transitional form includes the folding back and the roll-folding. At the folding back, the front-upper inflation portion 51 is folded back along the folding line 94, which is the boundary with the rear-lower inflation portion 45, toward the vehicle seat 14, which corresponds to the second vehicle seat, with respect to the rear-lower inflation portion 45 (FIGS. 12A, 12B, 13A, and 13B). At the roll-folding, the front-upper inflation portion 51 is roll-folded to arrange the bend portions 52 to 54 such that the closer a bend portion 52 to 54 is to the downstream end in the flowing direction of inflation gas, the more inward the bend portion 52 to 54 is located (FIGS. 14A, 14B, 15A, and 15B).

Thus, when the airbag 40 is made into the transitional form (FIGS. 15A, 15B), the airbag 40 has a shape that meets the conditions for the above advantage (1).

(6) The folding the airbag 40 in the transitional form into the storage form includes the accordion-folding. At the accordion-folding, the front-upper inflation portion 51 and the region of the rear-lower inflation portion 45 that is in front of and above the gas generator 30 are each accordion-folded toward the gas generator 30 (FIG. 16).

Thus, the airbag 40 is made into the storage form, in which the dimensions in the front-rear direction and the up-down direction of the airbag 40 are smaller than those before the accordion-folding, and the airbag 40 is more suitable for storage (FIGS. 17A, 17B).

(7) The folding performed prior to the folding back and the roll-folding includes the inward-folding, in which the airbag 40 is folded such that the rear end (the first section 92) of the airbag 40 is located inside the front portion (the second section 93) as shown in FIGS. 11A, 11B, and 12A.

Thus, the rear end of the airbag 40 is deployed and inflated rearward without wasted motion more quickly than in a case in which the rear end of the airbag 40 is folded in a different manner, for example, accordion-folded.

The above-described embodiment may be modified as follows.

The front-upper inflation portion 51 may include four or more bend portions. FIG. 19 shows an example in which the front-upper inflation portion 51 includes four bend portions 52, 53, 54, and 55. In this case also, the four bend portions 52 to 55 are each bent relative to the adjacent bend portion to be rolled such that the closer a bend portion 52 to 55 is to the downstream end in the flowing direction of inflation gas, the more inward the bend portion 52 to 55 is located.

The airbag 40 may be fixed to a member other than the bracket 22 as long as the airbag 40 is provided in one of the adjacent vehicle seats 13, 14 and in the side portion closer to the adjacent seat.

For example, the bolts 33 of the gas generator 30 may extend in the vehicle width direction instead of rearward. The bolts 33 may be inserted into the inner tube 80 and the airbag 40 and fastened to the side frame portion 21 in this state.

The inner tube 80 may extend vertically while surrounding the whole gas generator 30 (except for the bolts 33) including the gas outlet 31a.

The inner tube 80 may extend to the upper end of the rear-lower inflation portion 45. In this case, the upper opening 87 is arranged in the vicinity of the upper end of the inner tube 80.

The inner tube 80 may extend to the lower end of the rear-lower inflation portion 45. In this case, the lower opening 86 is arranged in the vicinity of the lower end of the inner tube 80.

Unlike the above illustrated embodiment, the gas generator 30 may be directly accommodated in the rear-lower inflation portion 45 without providing the inner tube 80. In this case, the front passage 67 and the upper passage 66 constitute the gas diverting passage 79. To cause a greater amount of inflation gas from the gas generator 30 to flow forward than upward, the lower partition 60 is arranged at a position where the flow passage area of the front passage 67 is larger than the flow passage area of the upper passage 66.

Although substantially the entire airbag 40 may be configured to be inflated as in the above-illustrated embodiment, the airbag 40 may also partially include a non-inflation portion, which is not supplied with inflation gas or inflated.

Contrary to the above-illustrated embodiment, the roll-folding may be performed, prior to the folding back, on the airbag 40 that has been subjected to the inward-folding to make the airbag 40 in the uninflated-and-spread form into the transitional form.

Among the multiple steps of folding the airbag 40, the inward-folding may be omitted.

Vehicles to which the above described far-side airbag apparatus is applied include various industrial vehicles in addition to private cars.

The invention claimed is:

1. A far-side airbag apparatus comprising:
an airbag, which is stored, in a storage form, in a vehicle seat, wherein the vehicle seat is one of two vehicle seats arranged in a width direction of a vehicle, and the airbag is stored in a side portion that faces the adjacent seat;
a gas generator, which supplies inflation gas to the airbag in response to an impact applied to a side wall of the vehicle from a side, wherein
each vehicle seat includes a headrest,
one of the two vehicle seats in which the airbag is stored is a first vehicle seat,
the other vehicle seat, which is adjacent to the first vehicle seat, is a second vehicle seat,
the far-side airbag apparatus is configured such that the airbag is deployed and inflated forward and upward between the first and second vehicle seats to a position above the headrest of the first vehicle seat,
the airbag has, in a lower part, a gas diverting passage that allows a greater amount of inflation gas from the gas generator to flow forward than upward,
when spread to be flat without being filled with inflation gas, the airbag is in an uninflated-and-spread form of larger dimensions than those in the storage form,
the airbag in the uninflated-and-spread form includes
a rear-lower inflation portion, which includes the gas diverting passage and the gas generator, and
a front-upper inflation portion adjacent to the rear-lower inflation portion, wherein the front-upper inflation portion is in front of and above the rear-lower inflation portion,
the front-upper inflation portion includes at least three bend portions, which are arranged in a flowing direction of inflation gas,
when the airbag is in a transitional form, which is between the uninflated-and-spread form and the storage form, wherein the bend portions are each bent relative to the adjacent bend portion and rolled toward the second vehicle seat relative to the rear-lower inflation portion such that the closer the bend portion is to a downstream end, the more inward the bend portion is located,
of the bend portions, the one that is located at a most upstream position in the flowing direction of inflation gas is a most upstream bend portion, and in the transitional form, an upper end of the most upstream bend portion is connected to an upper end of the rear-lower inflation portion.

2. The far-side airbag apparatus according to claim 1, wherein
the airbag includes two fabric portions, which are arranged in the width direction, and an upper partition, which bridges the fabric portions, and
in the front-upper inflation portion, the upper partition is located at a position that is spaced apart downward from an upper end of the front-upper inflation portion and spaced apart upward from a boundary with the rear-lower inflation portion.

3. The far-side airbag apparatus according to claim 1, wherein
the airbag includes two fabric portions, which are arranged in the width direction, and a lower partition, which bridges the fabric portions,
the lower partition is located in the rear-lower inflation portion, and
the gas diverting passage includes
an upper passage, which is located in the rear-lower inflation portion at a position behind and above the lower partition and conducts inflation gas from the gas generator upward, and
a front passage, which is located in the rear-lower inflation portion at a position in front of and below the lower partition and conducts a greater amount of inflation gas forward than the upper passage.

4. The far-side airbag apparatus according to claim 3, wherein
the airbag includes an inner tube, which is located in the rear-lower inflation portion behind the lower partition and has an upper end and a lower end,
the gas generator includes a gas outlet, through which inflation gas is discharged,
the inner tube extends vertically while surrounding at least the gas outlet of the gas generator and has an opening at each of the upper and lower ends,
the opening at the lower end has a greater opening area than the opening at the upper end, and
the gas diverting passage is constituted by the front passage, the upper passage, and the inner tube.

5. A method for folding an airbag, which is implemented to fold the airbag in the uninflated-and-spread form into the storage form during manufacture of the far-side airbag apparatus according to claim 1, the method comprising:
folding the airbag in the uninflated-and-spread form into the transitional form, the folding including
folding back the front-upper inflation portion along a boundary with the rear-lower inflation portion toward the second vehicle seat with respect to the rear-lower inflation portion, and
before or after the folding back, roll-folding the front-upper inflation portion to arrange the bend portions, which constitute the front-upper inflation portion, such that the closer a bend portion is to the downstream end in the flowing direction of inflation gas, the more inward the bend portion is located.

6. The method for folding an airbag according to claim 5, further comprising folding the airbag in the transitional form into the storage form, including accordion-folding, toward the gas generator, the front-upper inflation portion, on which the folding back and the roll-folding have been implemented, and a region of the rear-lower inflation portion in front of and above the gas generator.

7. The method for folding an airbag according to claim 5, further comprising, prior to the folding back and the roll-folding, inward-folding the airbag such that a rear end is located inside a front portion.

\* \* \* \* \*